United States Patent [19]

Karwowski et al.

[11] Patent Number: 4,603,055
[45] Date of Patent: Jul. 29, 1986

[54] PROCESS FOR THE PREPARATION OF MULTIPLE GRAIN FLAKED CEREAL

[75] Inventors: Jan Karwowski, Franklin Lakes; Robert F. Ferraro, Little Falls, both of N.J.

[73] Assignee: Nabisco Brands, Inc., Parsippany, N.J.

[21] Appl. No.: 696,162

[22] Filed: Jan. 29, 1985

[51] Int. Cl.$^4$ .............................................. A23L 1/164
[52] U.S. Cl. .................................... 426/621; 426/457; 426/625
[58] Field of Search ............... 426/618, 619, 620, 621, 426/625, 560, 555, 450, 455, 456, 457, 458, 459, 463, 464

[56] References Cited

U.S. PATENT DOCUMENTS

| | | |
|---|---|---|
| 1,189,134 | 6/1916 | Kellogg .................. 426/621 |
| 1,231,143 | 6/1917 | Engstad . |
| 1,424,927 | 8/1922 | Luft ....................... 426/621 |
| 2,064,701 | 12/1936 | Stokkebye ............... 426/457 |
| 2,864,702 | 12/1958 | Murray et al. ........... 426/619 |
| 2,882,162 | 4/1959 | Holahan .................. 426/457 |
| 2,898,210 | 8/1959 | Dale et al. ............... 426/457 |
| 3,318,705 | 5/1967 | Clausi et al. . |
| 3,342,607 | 9/1967 | Hickey . |
| 3,520,695 | 7/1970 | Hanser et al. ........... 426/619 |
| 3,544,322 | 2/1970 | Leebens .................. 426/560 |
| 3,620,760 | 11/1971 | Ver Steeg, Jr. et al. ... 426/311 |
| 3,620,761 | 11/1971 | Spring .................... 426/311 |
| 3,640,728 | 2/1972 | Ronai et al. . |
| 3,732,109 | 5/1973 | Poat et al. . |
| 3,852,491 | 12/1974 | Malzhen . |
| 3,887,714 | 6/1975 | Kelly . |
| 3,956,506 | 5/1976 | Cloud et al. . |
| 3,976,793 | 8/1976 | Olson et al. . |
| 4,038,427 | 7/1977 | Martin . |
| 4,097,613 | 6/1978 | DeLauder et al. . |
| 4,178,392 | 12/1979 | Gobble et al. . |
| 4,180,594 | 12/1979 | Graf . |
| 4,211,800 | 7/1980 | Scharschmidt et al. . |
| 4,435,430 | 3/1984 | Fulger et al. . |
| 4,551,347 | 11/1985 | Karwowski ............. 426/261 |

FOREIGN PATENT DOCUMENTS 697046 11/1964 Canada .
2000426 1/1979 United Kingdom .

OTHER PUBLICATIONS

N. Desrosier, 1977, Elements of Food Technology, AVI Publishing Co., Westport, CT, pp. 170-171.

*Primary Examiner*—Raymond N. Jones
*Assistant Examiner*—Carolyn Paden
*Attorney, Agent, or Firm*—Richard Kornutik

[57] ABSTRACT

This invention is a process for producing a mixed grain instant hot cereal product by cutting different grains by a steel cutting method, mixing the dry grains together, steaming the mixture, rolling the cooked grains on a flaking roller to form flakes, and baking the flakes. The process produces thicker than normal toasted flakes of high flake integrity that withstand packaging, shipping, and rehydration cooking.

1 Claim, No Drawings

PROCESS FOR THE PREPARATION OF MULTIPLE GRAIN FLAKED CEREAL

BACKGROUND OF THE INVENTION

1. Field of the Invention

This invention relates to the production of instant hot cereal products. In particular, this invention relates to a process for producing an instant hot cereal product which contains a mixture of various flaked cereal grains.

2. Description of the Prior Art

Breakfast cereal products are well known and have been produced by the industry for many years. In producing these cereals many different types of grains including, wheat, rye, oats, barley, rice, corn, buck wheat, and others have been used alone and in combinations to produce cereal products. Cereals have also taken on different forms including shredded, puffed, flaked, toasted and granular particles. These forms are present in hot cereals, dry cereals, granola type cereals and others.

Regardles of the form of the cereal, it is always the goal of the cereal industry to produce a product that is desirable to the consumer. To create a product that is desirable to consumers a variety of factors such as taste, texture, color, and particle shape and size must be considered. Another factor of great importance is the ability to maintain particle integrity when the particle is rehydrated. For example when milk is added to the cereal or in the case of a hot cereal, when it is heated with water the cereal particle or flake must maintain its integrity and texture. It is also important that a cereal maintains it particle integrity during packaging and shipping. A home prepared, hot cereal has an added requirement in that it must maintain its particle integrity when it is boiled in water before being consumed.

The general process used in the industry to produce a mixed grain cereal is to cook the different grains separately after cutting and then mix the wet mass. After the product is steamed, it enters a flaking process. During flaking, the cooked cut grain particles are formed into larger particles or flakes and dried. The seperate processing of the cooked grains requires special handling for mixing which ultimately increases the cost of the cereal. Quality is difficult to maintain when each grain is cooked separately because it is necessary to monitor the cooking parameters of each individual batch. These increased quality control measures also increase the cost of the final product.

An alternative process to produce a mixed grain cereal is to mix the different grains in their dry form after flaking. This process, while easier than handling the ready processed as previously discussed, has an added disadvantage in that increased handling at the dry, fragile stage causes breakage problems with the flakes. To mitigate these losses, manufacturing plants are usually set up with a gravity aided process, which starts at the top floor and ends with the finished product at the bottom floor. This process is typical for a single grain or single flake cereal. While this process has the added advantage of handling the flakes when they are dry, it also has the disadvantage of resulting in excessive breakage of the flakes. Flake breakage results in a high concentration of "dust" or fine particles. This increases the cost of the final product due to increased losses from breakage.

Cereal flakes not only must withstand the forces incurred during packaging and shipping, but also maintain their particle integrity upon rehydration, usually with milk in a cereal bowl. It is important that the cereal does not lose its texture upon rehydration, which would result in the cereal going "limp" and "soggy".

Rehydration occurs in two steps. The first step is when surface moisture contacts the flakes. The second step is absorption of moisture into the flake particle. The second step can be deliterious to the flake's integrity. It is desirable that the toasted flakes maintain a crisp inner portion, while the outer portion becomes wet and semi-soft. This results in a appetizing product that is easily consumed, but yet maintains its crispness and freshness in the cereal bowl.

Cooked cereals, have an added problem. The flakes of a cooked cereal have to withstand increased stress to their integrity during the cooking phase prior to consuming. It is desirable to consumers that a cooked cereal not turn into a fine particle mush during cooking. To avoid this, it is important to produce flake particles that are large and strong enough to maintain their integrity during cooking.

U.S. Pat. No. 3,544,332 to Leebens discloses a process for producing ready-to-eat breakfast cereal flakes. In this process, cereal grains such as wheat, oats, rice, corn, or combinations thereof are mixed into a dough form. The grains are cooked and formed into a dough at a temperature well over 200° F. Then the dough is processed by extrusion such that a "puffed" dough article results. The dough article is then tempered for a period of time. The dough is then sliced as opposed to the normal practice of shaping it into a pellet form before flaking. These slices are then placed on a flaking roller, flaked, and then toasted. The final product is either an individual cereal flake that has a mixture of various grains and ingredients or an individual cereal flake of a singular grain. The Leebens reference discloses a process to make flake particles from puffed dough, but the flake particles can not be used in cooked cereals.

U.S. Pat. No. 4,038,427 to Martin discloses a process for producing a ready-to-eat cereal consisting of puffed, toasted cereal flakes. The main cereal ingredients in this process are rolled oats, bumped wheat, and oven puffed rice flakes. These cereal grains are coated with syrup, grain by-products, and nut particles. The resulting product is commonly referred to as a "granola-type" cereal. The flakes in Martin do not have to retain particle integrity upon rehydration as do flaked cereals.

U.S. Pat. No. 4,211,800 to Scharschmidt et al. discloses a flaked cereal product coated with sugar and oil to enhance both sweetness and storage stability. This process discloses a cereal flake in which the grain is either corn, wheat, or oats. The grain is first cooked and then dried to approximately a 12 to 20 percent moisture content before tempering. After a tempering step, the grains are heated to a temperature between 140° F. and 200° F. in order to produce a pliable particle before flaking. The grains are then flaked and toasted. There are two additional steps after toasting. The flakes are first oil coated and then sugar coated. This results in a product with a cereal flake of a specific grain. This reference does not disclose a process to produce a mixture of different grain flakes. The primary purpose of this invention is to enhance the storage stability and sweetness of the cereal product.

U.S. Pat. No. 3,976,793 to Olson et al. discloses a sugar coated ready-to-eat cereal flake. In this process oat, soy, and wheat flour and made into a dough. The dough has a moisture content of 18 to 26 percent before cooking. Once the dough is cooked, it is formed into pellets and then dried to a moisture content of below 21 percent before it is flaked. The flakes are then toasted in a drier with temperatures between 250° F. to 300° F. The resulting product is a cereal flake that is a mixture of different cereal flours. Olson does not disclose a method to produce a cereal comprising a mixture of different grain types.

U.S. Pat. No. 4,180,594 to Graf discloses a process for the production of a mixed grain, cereal based product containing sugar, fat, and whey powder. In this process, cereal flakes chosen from a group of oats, barely, wheat, rye, and maze are dry mixed with sugar and whey powder. While the grains are being mechanically mixed, vegetable oil is added and the resulting composition is heated slightly. Hard fragments are formed. The fragments are then cooled and broken into granules. The granule sizes range from 3 to 10 millimeters. The resulting product is a granola type cereal.

U.S. Pat. No. 3,620,760 to Ver Steeg and 3,620,761 to Spring disclose a process of producing a cook-in-the-bowl type hot breakfast cereal. The process requires a mild fraction of grain and flaking of grain to a flake size of 0.007 to 0.008 inch thickness. The mild fraction is tempered to a moisture content of 15 to 16 percent at a temperature 185° F. to 220° F. It is then flaked by flaking rolls having a slight differential. After this further drying occurs. These references identify a home prepared hot cereal in which flaking occurs to achieve an appropriate particle size. These references are concerned only with wheat and oats and do not reveal a method of preparing a multi-grain hot cereal.

The references cited above do not disclose a process whereby individual grain flakes can be efficiently and economically mixed to produce a mixed grain cereal of high quality and consumer acceptability. The object of this invention is to provide a cereal of different grain types and a process that produces a mixed grain, flaked cereal, that maintains particle consistency and withstands rehydration during cooking. It is also an object of this invention to provide a process, in which handling procedures used to make a cereal of different grain types is minimized such that large particles and increased particle integrity results. It is a further object of this invention to provide a process whereby quality control expenditures are minimized by eliminating the need for separate batch processing of the individual grain flakes, thus, resulting in a more efficient production of a mixed grain cereal product.

SUMMARY OF THE INVENTION

The invention is an instant hot cereal product comprising flakes formed from a plurality of different types of grains. The invention includes a process for making the cereal product. The process includes cutting or grinding grains of a plurality of types into grain particles. Mixing of the cut grain particles together then occurs. The grain particles are then moistened. Steaming or pressure cooking at 2 and 3 pounds per square inch of the mixed grain particles follows. Rolling of the steamed grain particles on flaking rollers produces flake particles. Baking of the flake particles then occurs. The product of the process is a cereal having flake particles made from a plurality of grain types and has a flake integrity that withstands cooking.

An alternative embodiment of the invention includes a process whereby a mixture of different grains are steel cut to achieve uniform particle size. The cut grains are easily mixed together in this dry form. Water is added to the mixture and then the grains are steamed until they are soft, but not fully gelatinized. The grains are then tempered before they are placed on a flaking roll. The flaking roll is set to produce a flake thicker than normally used in the industry. After the cooked grains are flaked they are baked and a dry cereal flake results.

Alternative embodiments can include mixtures of grain types which are members of a group consisting of oats, barely, wheat, rye, oats, barley, rice, corn, and buckwheat.

DETAILED DESCRIPTION OF THE INVENTION

The present invention provides a process for making flake cereal product from a plurality of grain types. In the preferred embodiment a mixture of three grains types is used. These grain types can be any member of a group consisting of wheat, rye, oats, barley, rice, corn, and buckwheat. The grains are then cut to a size of approximately 0.132 inch or sufficient to pass a #6 mesh by any number of processes known in the art. Steel cut grains are preferred because a uniform grain particle size results. This uniform grain particle size aids in the steaming process of the different grains by allowing for even hydration. Also, steel cutting results in a final flake particle that is consistent in size and texture.

The cut grain particles are then mixed in their dry form. Mixing at this stage of the process in preferable because the dry particles are much more durable than when they are wet. The increased ease and manageability of handling dry grain particles at the mixing stage of the process reduces the cost of the finished product. Mixing after the processing stage, when the particles are in their flaked form, is difficult because of increased flow resistance. Unflaked grain particles are less fragile than are flaked particles. Mixing of grain particles when they are unflaked produces a more uniform product.

Water is then added to the grain particle mixture before steaming. The grain particles are steamed. Steaming instead of cooking in water is desirable because the flakes are more readily hydrated and obtain a smoother texture. The amount of time for steaming must be sufficient to inactivate enzymes present in the grain particles. It is therefore necessary to steam the grain particles for at least 15 minutes. The mixture is then tempered at room temperature for between about 15 and about 20 minutes. Tempering is necessary to uniformly distribute moisture throughout the grain particles that are partially cooked. Tempering also allows the water to penetrate the particles more effectively. The particles are then ready for flaking.

The temperature of the particles going into the flaking rollers is critical. It has been found that the temperature range of between about 140° F. and about 210° F. is optimum for this procedure. A temperatures above or below range tend to produce a product that sticks to the rollers. The optimum temperature range is critical to the release of natural gums in the cereal grains.

A moisture content of about 20 percent after steaming is optimum for producing the desired flakes of this process. Moisture contents greater than about 20 percent produce a dough mass which is "tacky" and sticks when passed through flaking rollers. Lower moisture contents produce a dough mass which is dry and crumbly and which prevents flaking at the desired thickness.

The cooked grain particles are flaked to a thickness of about 0.013 inch which is thicker than the flakes normally used in cooked cereals. Normal flakes are about 0.03 inch. Thicker flake particles are able to withstand the forces of rehydration and maintain particle integrity better than thinner flake particles.

The rolling process itself can be achieved by any of the commonly known rolling techniques in the art. The flake particles are then dried by baking to a moisture content of about 12 percent, which results in the formation of a product of desirable texture, crispness, and flake size. Drying the flakes to a 12 percent moisture content or less also results in a stable shelf life.

The product of this process is a home prepared hot cereal made from a plurality of grain types. The grain types can be varied to achieve different flavors. The use of different grain types may vary the amount of steaming and/or baking required in the above process. This is because of differences in a grain type's ability to absorb water and gelatinize during steaming and release that water during baking.

The practice of this invention is observed from the following examples. In these examples, a mix grain cereal product is made.

EXAMPLE I

Raw oats, barley, and wheat in equal proportions are steel cut to a uniformed particle size of approximately 0.132 inch or sufficient to pass a #6 mesh screen. These particles are then mixed together by mechanical mixing means such as ribbon or paddle mixers. The ingredients are then agitated to insure uniform distribution of the different grains throughout the mixture. Water is added to this mixture and it is steamed for 15 minutes. The steamed grains are thus softer and not fully gelatinized. The mixture is allowed to temper at room temperature for 15 to 20 minutes. The grains are then dumped into flaking roll feed hoppers and flaked on conventional flaking rolls to a thickness of about 0.013 inch. The flakes are then gravity fed to an oven where they are dried at a temperature of 200° F. and a moisture content of 12 percent by weight.

EXAMPLE II

This example is prepared in the same manner as that of Example I. In this Example, raw oats, barley, wheat and corn, in equal proporations are steel cut to a uniform particle size. The resulting home prepared cereal is a mixture of four natural grains.

EXAMPLE III

In this example raw oats, rye grain, and wheat are steel cut. The raw oats comprise 50 percent of the mixture and the rye grain and barley are each 25 percent of the mixture. The oat portion of the cereal provides the greatest amount of flavor to the final product. The grains are prepared in the same manner as that disclosed in Example I.

What is claimed is:

1. A process for producing a cereal comprising:
   (a) cutting grains into grain particles with steel blades, said grains being of three different grain types and each grain type being a member selected from the group consisting of wheat, rye, oats, barley, rice, corn, and buckwheat, said grain particles being of a thickness of about 0.132 inch;
   (b) mixing the cut grain particles together;
   (c) moistening the mixed grain particles;
   (d) steaming the moistened grain particles to a moisture content of about 20 percent;
   (e) tempering the steamed grain particles at a temperature between about 140° F. and about 210° F. and for about 15 to about 20 minutes to uniformly distribute moisture;
   (f) rolling the steamed grain particles at a temperature between about 140° F. and about 210° F. on flaking rollers to form flake particles having a thickness of about 0.013 inch; and
   (g) baking the flake particles to a moisture content of about 12 percent whereby said flake particles rehydrate upon addition of boiling water.

* * * * *